(12) United States Patent
Dubuc

(10) Patent No.: US 8,714,774 B2
(45) Date of Patent: May 6, 2014

(54) LIGHT EMITTING DIODE (LED) LIGHT FIXTURE FOR A GREENHOUSE AND A GREENHOUSE INCORPORATING A LED LIGHT FIXTURE

(75) Inventor: Eden Dubuc, Quebec (CA)

(73) Assignee: GE Lighting Solutions, LLC, East Cleveland, OH (US)

( * ) Notice: Subject to any disclaimer, the term of this patent is extended or adjusted under 35 U.S.C. 154(b) by 213 days.

(21) Appl. No.: 13/227,584

(22) Filed: Sep. 8, 2011

(65) Prior Publication Data
US 2013/0063930 A1 Mar. 14, 2013

(51) Int. Cl.
*F21V 5/00* (2006.01)
*F21V 7/00* (2006.01)

(52) U.S. Cl.
USPC .................................... 362/244; 362/249.02

(58) Field of Classification Search
USPC ................ 362/217.05, 243, 244, 245, 249.02
See application file for complete search history.

(56) References Cited

U.S. PATENT DOCUMENTS

| 2004/0233672 | A1 | 11/2004 | Dubuc |
| 2006/0254135 | A1 | 11/2006 | Dubuc |
| 2007/0101645 | A1* | 5/2007 | Christopher et al. ............. 47/67 |
| 2012/0161170 | A1 | 6/2012 | Dubuc |
| 2013/0021797 | A1* | 1/2013 | Kubo ........................... 362/235 |

FOREIGN PATENT DOCUMENTS

| DE | 8503284 U1 | 6/1986 |
| EP | 2128520 A1 | 12/2009 |
| WO | 2005104817 A1 | 11/2005 |
| WO | 2009141287 A1 | 11/2009 |
| WO | 2010089455 A1 | 8/2010 |

OTHER PUBLICATIONS

EP Search Report and Opinion dated Jul. 3, 2013 from corresponding EP Application No. 12182740.6.

\* cited by examiner

*Primary Examiner* — David V Bruce
(74) *Attorney, Agent, or Firm* — Peter T. DiMauro; GE Global Patent Operation

(57) ABSTRACT

A greenhouse lighting fixture includes a Light Emitting Diode (LED) base support having a plurality of spaced-apart LEDs extending along a longitudinal axis of the LED base support. An optical element is coupled with the LED base support and has optical characteristics that result in at least 50% of the light produced by the LEDs being projected sideways from the fixture in oppositely directed side zones that flank a central zone wherein light is substantially blocked from projecting below the fixture. A greenhouse is encompassed that may include one or more of the LED lighting fixtures.

20 Claims, 7 Drawing Sheets

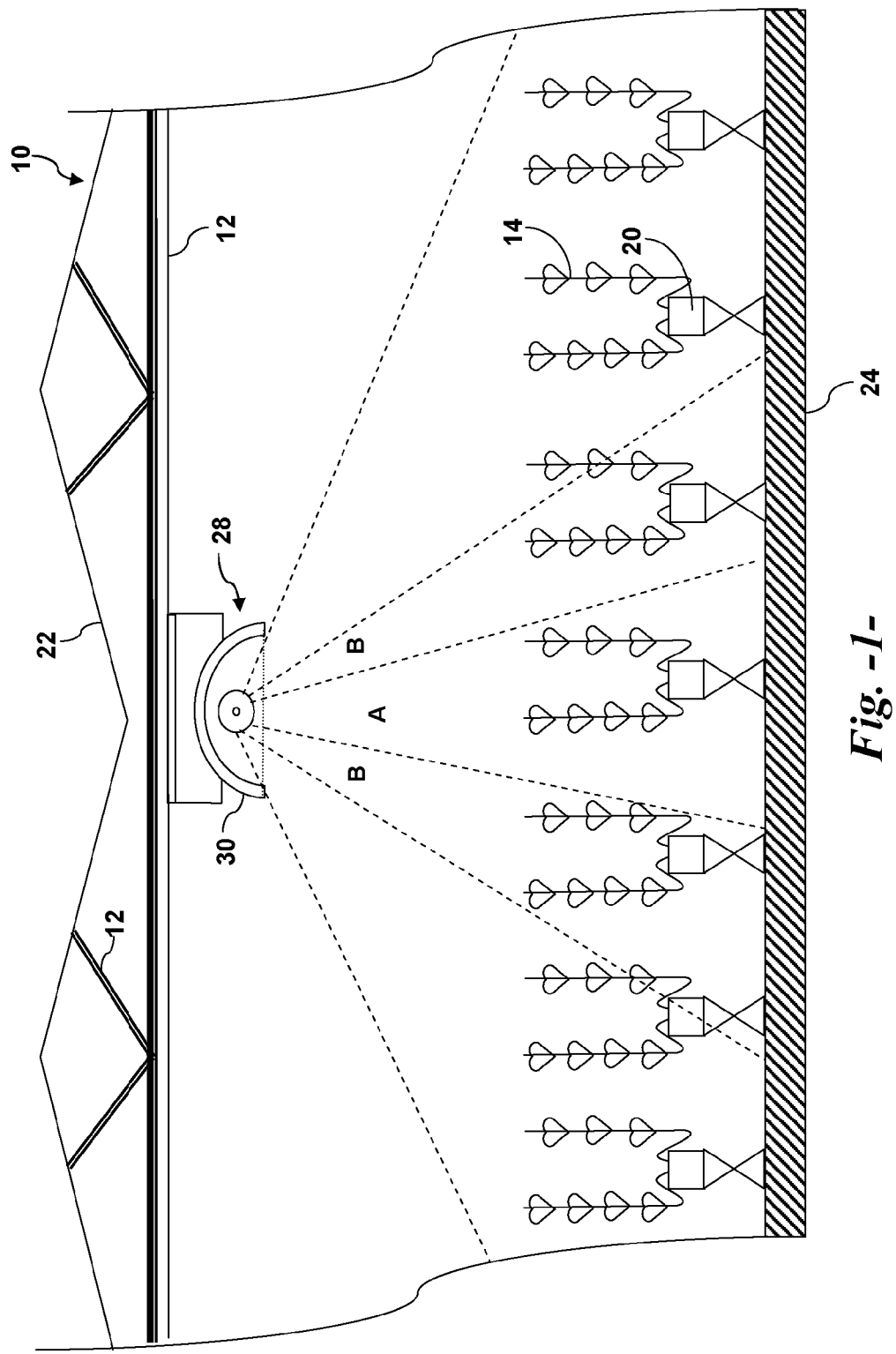
*Fig. -1-*
*Prior Art*

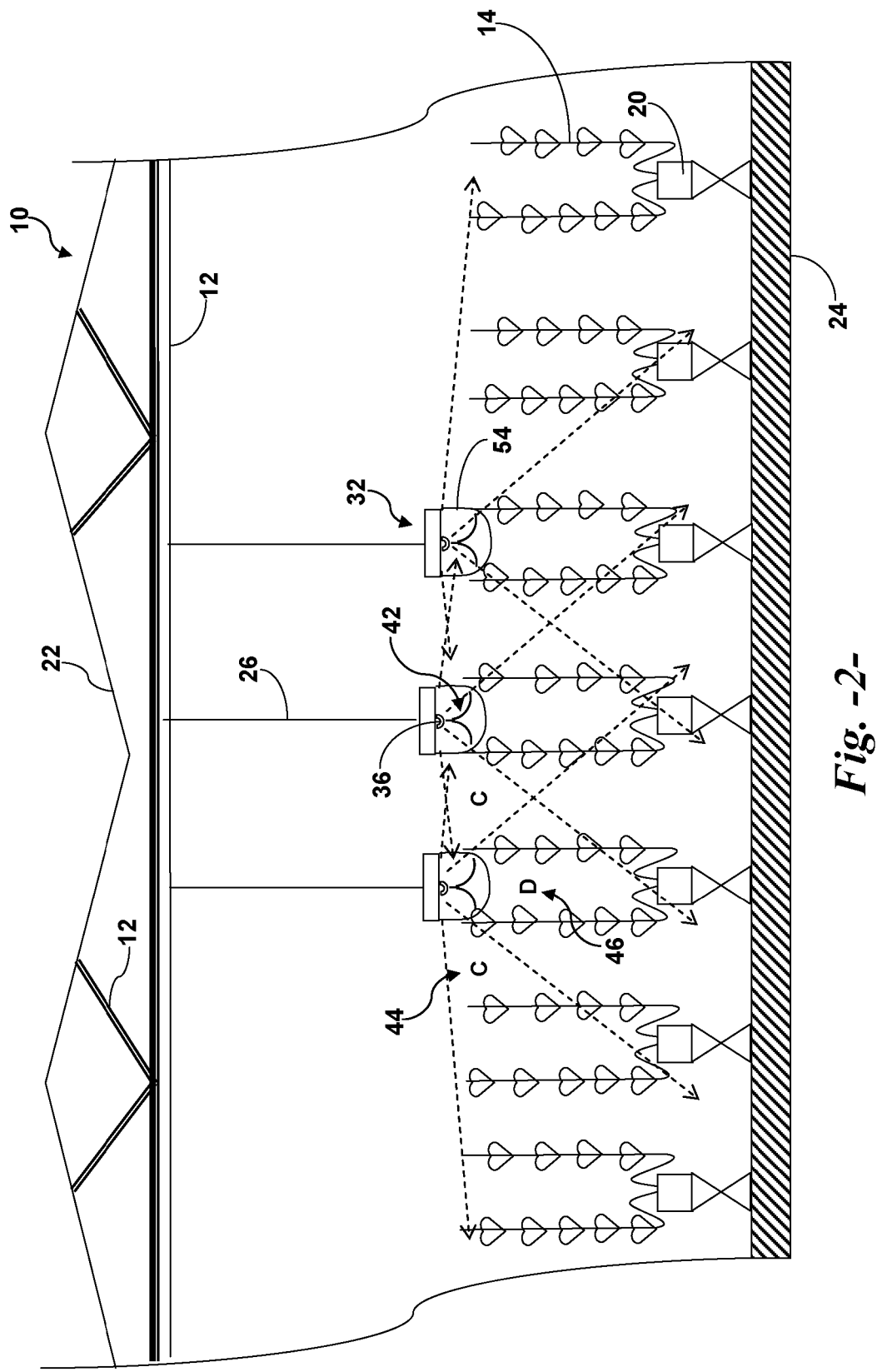
Fig. -2-

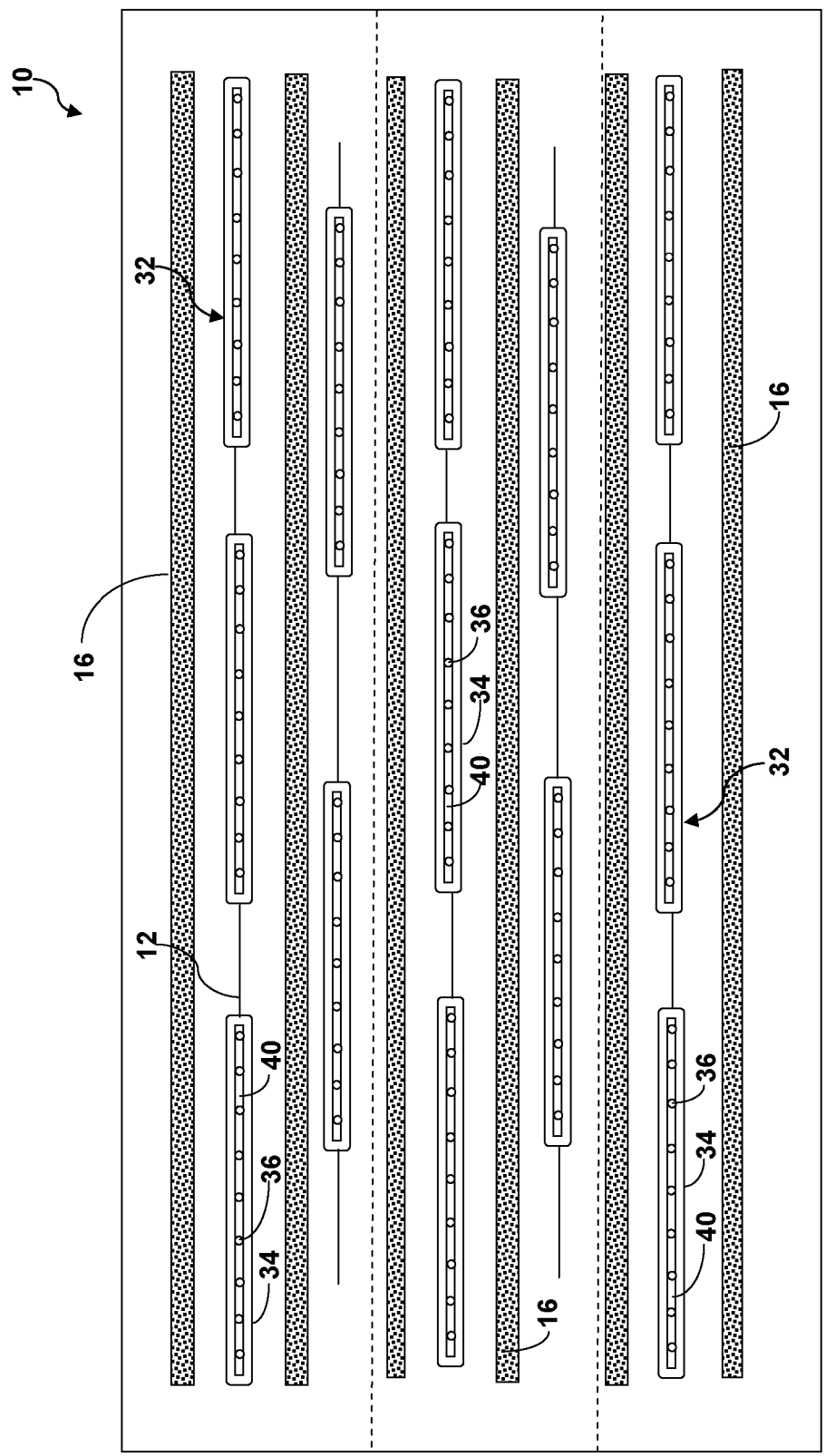
Fig. -3-

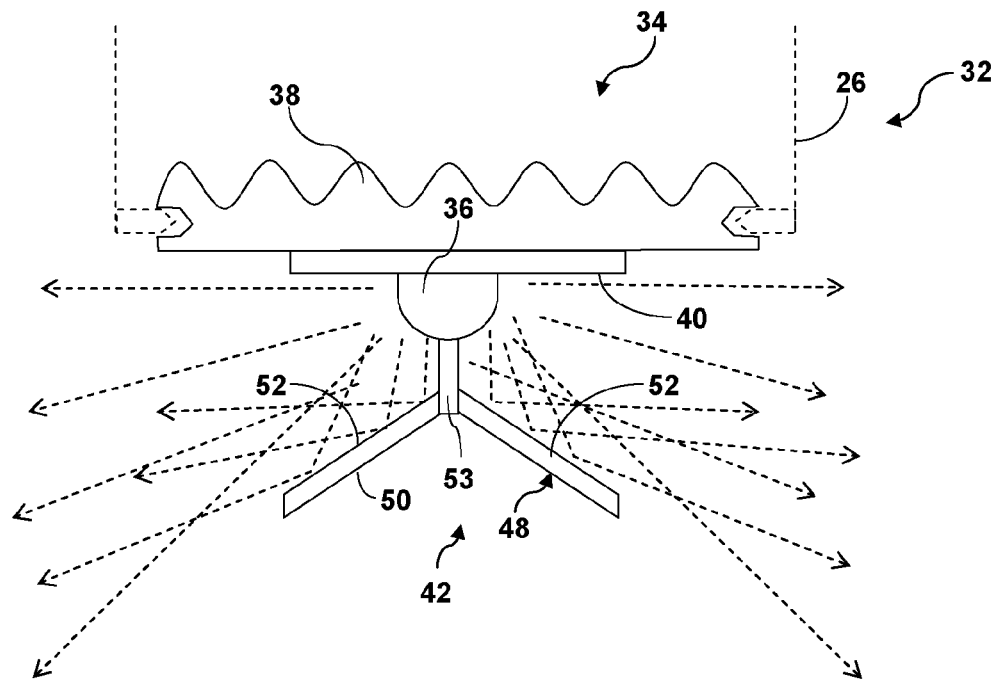
*Fig. -4-*
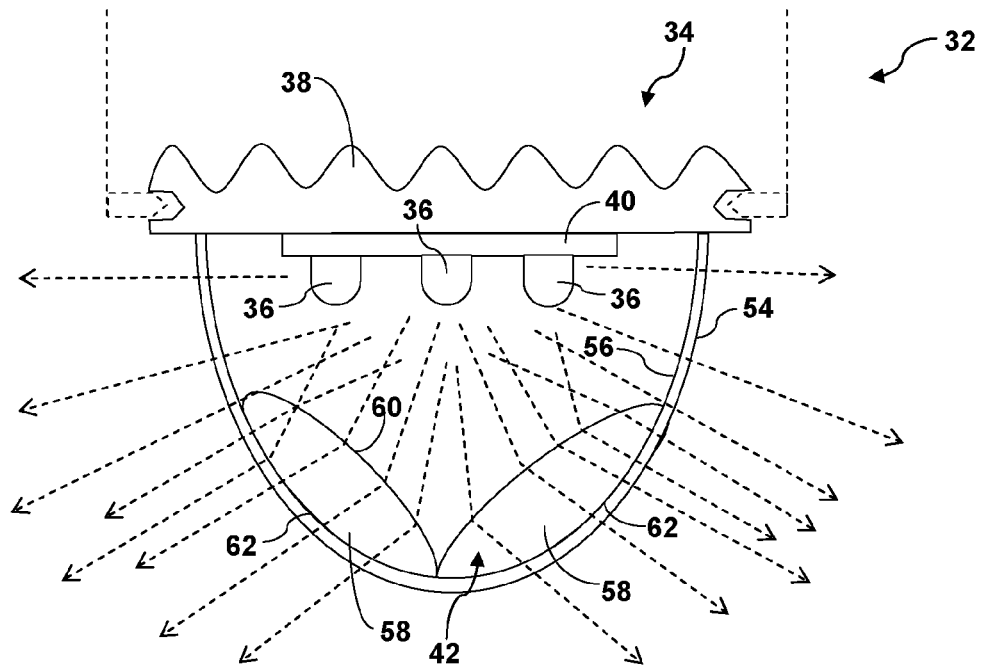
*Fig. -5-*

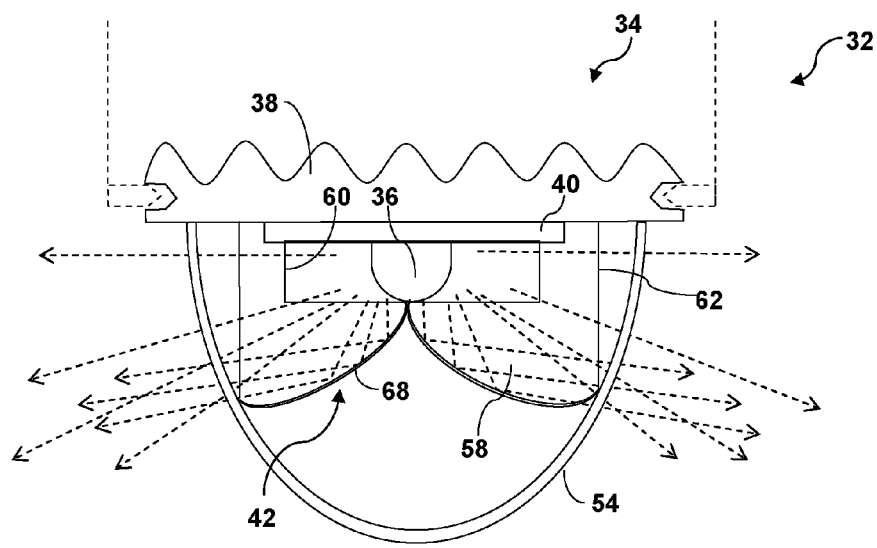
*Fig. -6-*
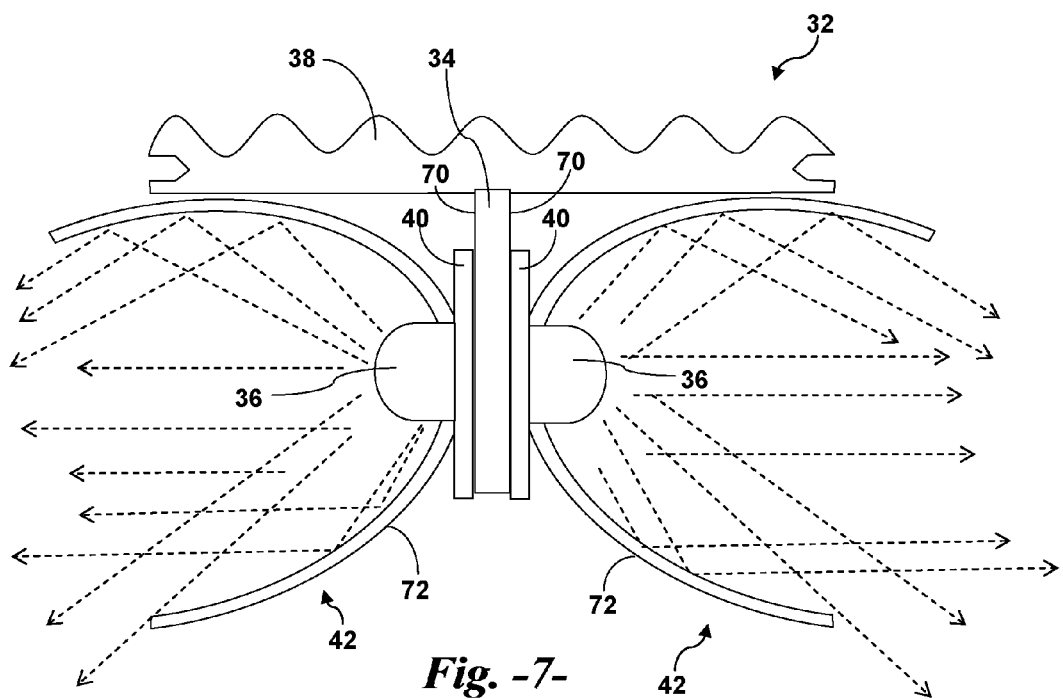
*Fig. -7-*

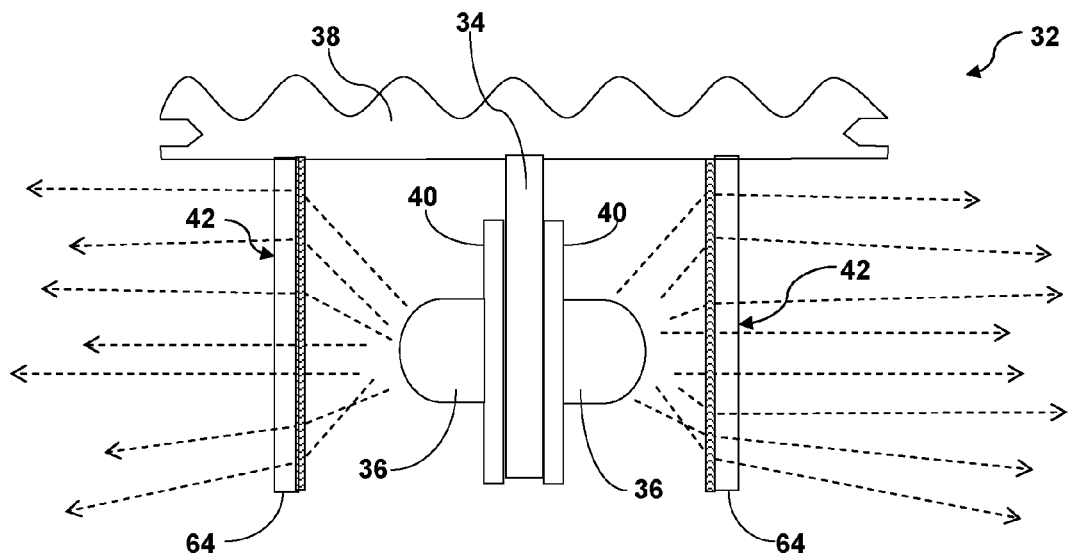
*Fig. -8-*
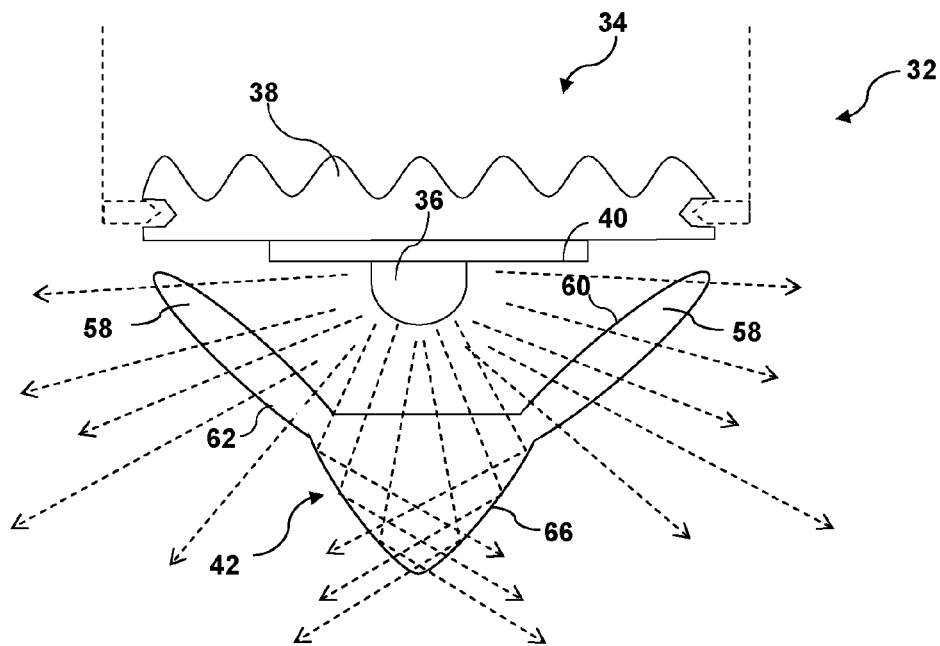
*Fig. -9-*

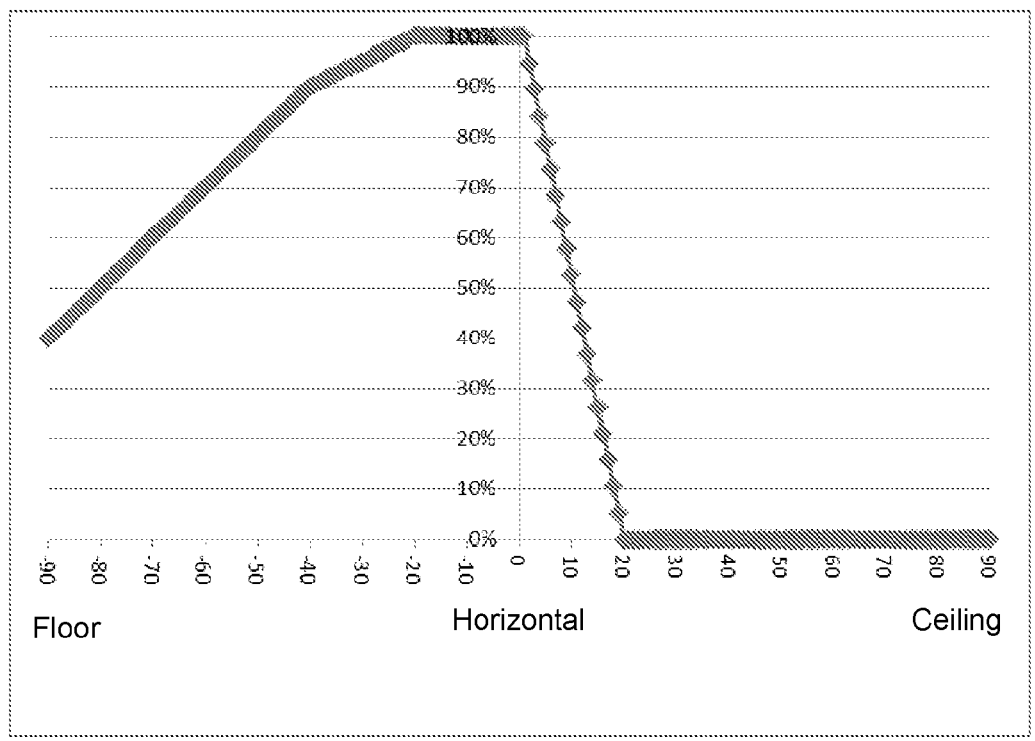
Fig. -10-

LIGHT EMITTING DIODE (LED) LIGHT FIXTURE FOR A GREENHOUSE AND A GREENHOUSE INCORPORATING A LED LIGHT FIXTURE

BACKGROUND OF THE INVENTION

A. Field of the Invention

The field of the invention relates generally to greenhouse lighting fixtures, and more particularly to an improved LED greenhouse light fixture, as well as a greenhouse that utilizes one or more of the LED light fixtures.

B. Description of Related Art

Greenhouses commonly use artificial supplemental light to encourage or promote plant growth. Typical types of greenhouse lighting systems include incandescent lights, florescent lights, and various high-intensity discharge (HID) lamps, including high-pressure sodium (HPS) lights, metal halide lights, and mercury vapor lights. Although each of these types of light has respective attributes useful for different phases of plant growth, the most predominantly used type of supplemental light has been HPS lamps, primarily because they are less expensive to purchase and operate, and have a relatively high efficiency (convert about 25% of electricity into light energy). HPS lamps are, however, not without disadvantages.

FIG. 1 illustrates a greenhouse 10 that utilizes one or more HPS lighting fixtures 28 to provide artificial light to rows of plants 14 supported above a floor 24 in grow containers 20. The greenhouse 10 has a roof 22, and the HPS lighting fixtures 28 are supported on or from frame structure members 12 in close proximity to the roof 22, as is known in the art. The HPS fixtures 28 are relatively large and it has been estimated that these fixtures 28 block about 10% of the lighted footprint of a greenhouse from receiving sunlight. The fixtures 28 are also quite heavy. A single HPS lighting fixture 28 may weigh about 40 lbs., thus requiring more robust greenhouse frame structure 12 to support the fixtures 28. The HPS lighting fixtures 28 generate noise and the bulbs have a short life. In addition, the HPS lamps generate significant radiated heat, which prevents the lamps from being placed in close proximity to the plants. Because the HPS lighting fixtures 28 are supported at relatively high heights above the plants 14, even with reflectors 30, a significant portion of the emitted light is directed to towards the floor 24 of the greenhouse in zones "A" and "B" depicted in FIG. 1 and is not absorbed by the plants, resulting in an inefficient use of the light and increased power consumption for a given measure of plant growth.

The use of intra-row greenhouse LED lighting systems has been proposed as a means to tailor supplemental light at a specific wavelength to particular target plant growth phases, as well as to increase the amount of light absorbed by the plants. LED lights produce relatively little radiated heat and can thus be placed relatively close to the plants, and various intra-row systems place the LED fixtures between the rows of plants. However, even with the use of narrow beam pattern LEDs, a substantial portion of the emitted light is still not absorbed by the plants.

Thus, an improved greenhouse lighting system fixture is desirable to address at least one of the deficiencies of present systems, particularly inefficient plant absorption of the produced light.

BRIEF DESCRIPTION OF THE INVENTION

Aspects and advantages of the invention will be set forth in part in the following description, or may be obvious from the description, or may be learned through practice of the invention.

One or more embodiments of the present subject matter provide a greenhouse light fixture that is relatively light, produces minimal heat, and emits a light pattern that results in a greater portion of the emitted light being absorbed by plants and, thus, reduced power consumption per measure of growth performance.

In one embodiment, a greenhouse lighting fixture includes a Light Emitting Diode (LED) base support with a plurality of spaced-apart LEDs extending along a longitudinal axis of the LED base support. An optical element is coupled with the LED base support and has optical characteristics that result in at least 50% of the light produced by the LEDs being projected sideways from the fixture in oppositely directed side zones that flank a central zone wherein light is substantially blocked from projecting downwardly from an overhead fixture and upwardly from a floor-mounted fixture. For example, the side zones may define an angular sector that extends to about 60° below a horizontal plane through the LED base support. In one embodiment, this angular zone may extend between about 10° to about 45° below horizontal.

The optical element may be any one or combination of optical components that guide or direct the light emitted from the LEDs. For example, the optical element may be any configuration of reflector structure disposed relative to the LEDs to reflect emitted light into the side zones and away from the central zone. In one embodiment, the reflector structure may be an inverted, generally V-shaped reflector suspended from the LED base support below the LEDs such that side faces of the reflector direct the emitted light from the LEDs into the side zones, with the blocked central zone defined below the reflector.

An optically neutral cover may be attached to the LED base support and enclose the LEDs and optical element. For example, the optical element may be configured on an inner face of the cover, or may be separate from the cover and supported by the LED base support.

In another embodiment, the optical element may be a linear refractive lens that is disposed relative to the LEDS such that light emitted from an exit face of the lens is directed into the side zones and away from the central zone. Various suitable lens or lens combinations may be used, including a linear collimating lens, a converging lens, a linear total internal reflection (TIR) lens, and so forth.

In some embodiments of the lighting fixture, the LED base support is horizontally oriented such that the LEDs are downwardly oriented (project light along a generally vertical axis), with the optical element disposed below the LEDs.

In other embodiments, the LED base support is vertically oriented, and may include a plurality of the LEDS sideways oriented (project light along a generally horizontal axis) along opposite sides of the LED base support. With this "sideways" embodiment, the optical element may be, for example, sideways oriented reflector structure that extends along each opposite side of the LED base support to direct the emitted light into the side zones, with the central zone defined below the oppositely oriented reflector structures. The optical element may be a linear refractive lens, such as a linear collimating lens, disposed across from each opposite side of the LED base support such that light emitted from an exit face of the lens is directed into the side zones.

In addition to the various embodiments of greenhouse lighting fixtures, the present invention also encompasses any manner of greenhouse that incorporates one or more of the unique LED lighting fixtures according to the present disclosure.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a depiction of a greenhouse with conventional lighting fixtures;

FIG. 2 is a depiction of a greenhouse with an embodiment of a LED lighting fixture;

FIG. 3 is a top planar view of a greenhouse with a plurality of LED lighting fixtures;

FIG. 4 is a side view of an embodiment of a LED lighting fixture;

FIG. 5 is a side view of a different embodiment of a LED lighting fixture;

FIG. 6 is a side view of still another type of LED lighting fixture;

FIG. 7 is a side view of an alternative embodiment of a LED lighting fixture;

FIG. 8 is a side view of still another type of LED lighting fixture;

FIG. 9 is a side view of yet another embodiment of a LED lighting fixture; and

FIG. 10 is a graph of light absorption by a plant as a function of angular direction of the light under certain greenhouse conditions.

DETAILED DESCRIPTION OF THE INVENTION

Reference now will be made in detail to embodiments of the invention, one or more examples of which are illustrated in the drawings. Each example is provided by way of explanation, not limitation. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 2 illustrates a greenhouse 10 of any conventional construction. The greenhouse 10 includes a roof 22 and frame structure 12. A plurality of greenhouse LED lighting fixtures 32 in accordance with various embodiments of the present disclosure are suspended from the frame structure members 12 by any conventional suspension elements 26, such as chains, cables, hoist systems, and the like. It should also be understood that, in other embodiments encompassed by the present invention, the lighting fixtures 32 may be part of an "intra-lighting" system wherein the fixtures 32 are supported by ground structure at a height between the plants in the greenhouse. With this type of system, far less shadow is cast by the lighting fixtures and the roof 22 and frame structure need not be designed to support the weight of the fixtures 32. In the illustrated embodiments, the lighting fixtures 32 may be adjustable in height relative to the roof 22 or frame structure 12 so that the lighting fixtures 32 can be adjusted to accommodate increased height of the plants 42 during various growth phases of the plants, with the fixtures placed within the leaf area of the plants in certain embodiments. The plants 14 are grown in containers 20 supported above a floor 24 of the greenhouse 10 in this particular embodiment. It should be appreciated that the greenhouse 10 is not limited to any particular frame structure, construction, and so forth, and that the plants 14 may be grown in any suitable growing system within the greenhouse 10.

Still referring to FIG. 2, each of the LED lighting fixtures 32 includes a plurality of spaced apart LEDs that extend a longitudinal axis of the fixture 32. The invention is not limited to any particular type of LED, and the LEDs 36 may be, for example, high output LEDs, low power LEDs, a combination of multiple LEDs of the same or different wavelengths, and so forth. The LEDs 36 may be provided in the form of a LED light strip, LED tube light, or any other known LED configuration wherein a plurality of LEDs are provided in a generally spaced apart and aligned configuration. The term "LED base support" is used generically herein to encompass such configurations.

An optical element 42 is operatively configured with the fixture 32 and the LEDs 36. A cover 54 may enclose the optical element 42 and LEDS 36. The optical element 42 may vary widely within the scope and spirit of the invention, as discussed in greater detail below. The optical element 42 has optical characteristics that result in at least about 50% of the light produced by the LEDs 36 being projected generally sideways from the fixture 32 in oppositely directed side zones 44 (indicated by the angular zones "C" in FIG. 2). The side zones 44 flank a central zone 46 (indicated by the angular zone "D" in FIG. 2) wherein light from the LEDs is substantially blocked from projecting below the fixture 32. It should be appreciated that the light from the LEDs 36 may not be completely blocked from the central zone 46 and that some degree of the light will inevitably radiate into the central zone 46. The intent, however, is that at least 50% of the light initially emitted from the LEDs 36 is directed into the side zones 44. The remaining portion of the light will be variously projected and scattered within the greenhouse 10. It should be readily appreciated that, as compared to the prior art configuration of FIG. 1, a substantially greater amount of the light is projected into the side zones 44 as compared to the central zone 46. In the prior art configuration, the majority of the light from the fixture 28 (e.g. HPS fixture) was projected into the zones A and B that essentially correspond to the blocked central zone 46 in FIG. 2.

FIG. 10 is a graph that represents a computer-modeled absorption by the plants (in percent of total light) of light from a greenhouse LED fixture as a function of angular projection of the light. The graph was generated for a typical greenhouse plant configuration, for example a tomato plant with a leaf height of about 1.2 m., a distance between adjacent plant rows of about 70 cm, and with the LED fixture suspended between the plant rows at a height of about 20 cm from the top of the plants. The graph illustrates the concepts discussed above. At a horizontal projection of the light, nearly 100% of the light is absorbed by the plants. The percent absorption drops dramatically as the angular orientation changes towards the greenhouse ceiling such that, at about a 20° up angle, the percent absorption drops to near 0%. In the other direction, the slope of the absorption curve is flatter. From about 40° down angle to horizontal, about 90% or greater of the light is absorbed by the plants. At a down angle of about 80°, about 50% of the light is absorbed, and so forth.

The extent of the side zones 44 may vary depending on any number of factors, including the type of plants being grown, plant height, the time in the life cycle of the plants, and so forth. In certain embodiments, it has been found that a desirable angular sector for the side zones 44 is from a horizontal plane relative to the LEDs 36 to less than about 60° below the horizontal, for example about 45° degrees below the horizontal, including any sub angular sectors within this range. For example, in one embodiment, the angular sector for the side zones 44 may extend between about 5° degrees below horizontal to about 35° degrees below horizontal.

Referring to FIG. 3, the greenhouse structure 10 is illustrated in a top planar view. Plant rows 16 are grown within the structure and a plurality of the LED lighting fixtures 32 are disposed between the plant rows 16 and are suspended from any manner of suitable frame structure 12. Each of the lighting fixtures 32 may, in this embodiment, include a LED base support 34 having a plurality of longitudinally spaced-apart LEDs 36 on a LED board 40, which may any suitable structure on which the LEDs 36 are operationally mounted. The lighting fixtures 32 are provided in a number and pattern so as to provide adequate light coverage for the multiple plant rows 16.

FIG. 4 depicts a particular embodiment of a lighting fixture 32 wherein a LED base support 34 is suspended via any manner of suitable suspension elements 26. The operation and construction of the LED base support 34 may vary widely within the scope and spirit of the invention. In certain embodiments, the LED base support may simple be an elongated support member, such as a bar, rail, or the like. In the illustrated embodiments, the LED base support 34 is configured as a heat sink member 38, with the LED boards 40 coupled to the heat sink 38. The LEDs 36 are disposed in a spaced-apart pattern along the longitudinal length of the LED board 40. In this particular embodiment, the optical element 42 is defined by any configuration of reflector structure 48 in order to reflect the light emitted from the LEDs 36 into the side zones as depicted by the dashed lines in FIG. 4. In this embodiment, the reflector structure 48 is defined by an inverted, generally V-shaped reflector 50 having angled side faces 52. The term "V-shaped" is used generically herein to include generally any open-ended shape having side faces, such as U-shape, C-shape, and so forth. The side faces 52 are at a position and angular orientation relative to the LEDs 36 such that light that would otherwise be directed into the central zone 46 (FIG. 2) is reflected by the side faces 52 into the side zones 44 (FIG. 2.). The side faces 52 may be suspended below the LEDs 36 by any manner of suitable support structure 53. For example, the support structure 53 may be a longitudinally extending plate-like member that is also attached to LED board 40 with intermittent recesses defined therein to accommodate the LEDs 36.

FIG. 5 depicts another embodiment of a LED lighting fixture 32 wherein the LED base support 34 is configured as a heat sink 38 with LED board 40 coupled thereto. In this embodiment, multiple LED rows 36 are arranged on the LED board 40 instead of a single row of LEDs 36 as in the embodiment of FIG. 4. The multiple rows of LEDs 36 may be selected for various design considerations. For example, multiple LEDs 36 may have the same or different wavelength characteristics to increase/decrease particular growth characteristics of the plants. The LEDs 36 may all be energized at the same time, or selected rows or groups of the LEDs 36 may be separately energized depending on the overall control scheme.

In the embodiment of FIG. 5, the optical element 42 is depicted as any suitable combination of lenses 58, particularly linear refractive lenses. A single lens 58 may also be used. The lenses 58 have an incident face 60 and an exit face 62, and are disposed and angularly oriented relative to the LEDs 36 such that light from the LEDs that would otherwise radiate directly into the central zone 46 (FIG. 2) is redirected and exits the face 62 of the lens 58 and radiates into the side zones 44 (FIG. 2). It should be readily appreciated that numerous and various different types of lenses 58 may be utilized in this regard, and that the optical element 42 is not limited to any particular type, style, or combination of lenses 58 and/or reflector structure 48 (FIG. 4).

FIG. 5 also depicts a cover 54 that may be coupled to the heat sink 38 (or other structure of the fixture 32). The cover 54 may be an optically-neutral element that serves to enclose the LEDs 36 and optical elements 42. In the embodiment of FIG. 5, the optical element 42 are actually coupled to or incorporated with the cover 54. In other embodiments, the optical elements 42 may be separate from the cover 54 and supported or suspended from the heat sink 38, as in the embodiment of FIG. 4.

The embodiment of FIG. 6 depicts a lighting fixture 32 having a LED base support 34 configured as a heat sink 38 with a LED board 40 coupled thereto. The optical element 42 in this particular embodiment is a TIR (total internal reflection) lens having an internal reflective surface 68 oriented such that light entering the lens 58 through the incident face 60 that would otherwise radiate directly into the zone below the LED 36 is internally reflected from the surface 68 into the side zones, as discussed above. A cover 54 may also be used in this embodiment.

FIG. 9 depicts an embodiment of a lighting fixture 32 having a LED base support 34 configured as a heat sink 38 with a LED board 40 coupled thereto. The optical element 42 in this particular embodiment is a combination of TIR (total internal reflection) lens 66 and side refractive lenses 58. The TIR lens 66 is disposed generally below the LED 36 and includes internal reflective surfaces that reflect incident light at certain incident angles towards the opposite face of the lens 66 at an incident angle that allows the light to pass through the respective opposite face into the side zones, as depicted in FIG. 9. The side refractive lenses 58 direct incident light directly towards the side zones.

In the embodiments of FIGS. 4 through 6, the LED board 40 is oriented generally horizontally such that the LEDs 36 are downwardly oriented and the optical element 42 is disposed generally below the LEDs 36. FIG. 7 depicts an alternate embodiment wherein the LED lighting fixture 32 includes a LED base support 34 with LED boards 40 coupled to opposite sides 70 of the base support 34. The base support 34 is coupled to a heat sink 38. In this embodiment, the LEDs 36 are thus oriented sideways along the opposite sides 70 of the base support 34 such that the light emitted from the LEDs 36 is directed in opposite directions along a generally horizontal axis. The optical elements 42 may be, for example, any manner of reflector structure, such as the sideways-oriented reflectors 72 operatively configured with each of the LED boards 40. The reflector structure 72 may be designed and oriented such that the light emitted from the LEDs 36 is directed into a respective side zone 44 (FIG. 2). The area under the LED base support 34 corresponds to the central zone 46 (FIG. 2) and the reflectors 72 block light from the LEDs 36 from entering this zone. Likewise, the reflectors 72 also redirect light that would be emitted upwards from the LEDs 36 back down into the side zones, as depicted by the dashed lines in FIG. 7.

FIG. 8 depicts another embodiment of a LED lighting fixture 32 having a light board 34 oriented generally vertically relative to the heat sink 38, as in the embodiment of FIG. 7. LED boards 40 and associated LEDs 36 are provided on opposite sides of the board 34. In this embodiment, the optical element 42 associated with each of the boards 40 is a lens having optical characteristics to redirect the light emitted from the LEDs 36 into the side zones. In this particular configuration, the lens may be a converging lens, such as a Fresnel linear collimating lens 64.

The present invention also encompasses any type of greenhouse 10 (FIG. 2) that incorporates one or more of the embodiments of a LED lighting fixture 32 as described an enabled herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A greenhouse lighting fixture, comprising:
   a Light Emitting Diode (LED) base support, said LED base support comprising a plurality of spaced-apart LEDs extending along a longitudinal axis of said LED base support; and
   an optical element coupled with said LED base support, said optical element having optical characteristics that result in at least 50% of the light produced by said LEDs being projected sideways from said fixture in oppositely directed side zones that flank a central zone in which light is substantially blocked from projecting below said fixture.

2. The greenhouse lighting fixture of claim 1, wherein said side zones define an angular sector within a range of from horizontal relative to said LED base support to less than about 45° below horizontal.

3. The greenhouse lighting fixture of claim 2, wherein said angular sector extends between about 5° below horizontal to about 35° below horizontal.

4. The greenhouse lighting fixture of claim 1, wherein said optical element comprises reflector structure disposed relative to said LEDs to reflect emitted light into said side zones and away from said central zone.

5. The greenhouse lighting fixture of claim 4, wherein said reflector structure comprises an inverted generally V-shaped reflector disposed vertically below said LEDs such that side faces of said reflector direct the emitted light into said side zones, said central zone defined below said reflector.

6. The greenhouse lighting fixture of claim 1, further comprising an optically neutral cover attached to said LED base support and enclosing said LEDs, said optical element configured on an inner face of said cover.

7. The greenhouse lighting fixture of claim 1, wherein said optical element is suspended from said LED base support, and further comprising an optically neutral cover attached to said LED base support and enclosing said LEDs and said optical element.

8. The greenhouse lighting fixture of claim 1, wherein said optical element comprises a linear refractive lens disposed relative to said LEDS such that light emitted from an exit face of said lens is directed into said side zones.

9. The greenhouse lighting fixture of claim 8, wherein said lens is a converging lens.

10. The greenhouse lighting fixture of claim 8, wherein said lens is a linear total internal reflection (TIR) lens.

11. The greenhouse lighting fixture of claim 1, wherein said LED base support is horizontally oriented such that said LEDs are downwardly oriented, said optical element disposed below said LEDs.

12. The greenhouse lighting fixture of claim 1, wherein said LED base support is vertically oriented, and further comprising a plurality of said LEDS sideways oriented along opposite sides of said LED base support.

13. The greenhouse lighting fixture of claim 12, wherein said optical element comprises sideways oriented reflector structure extending along each opposite side of said LED base support to direct the emitted light into said side zones, said central zone defined below said oppositely oriented reflector structure.

14. The greenhouse lighting fixture of claim 12, wherein said optical element comprises a linear refractive lens disposed across from each opposite side of said LED base support such that light emitted from an exit face of said lens is directed into said side zones.

15. The greenhouse lighting fixture of claim 14, wherein said lens is a converging lens.

16. A greenhouse, comprising:
   a Light Emitting Diode (LED) lighting fixture, said LED lighting fixture further comprising
   a LED base support having a plurality of spaced-apart LEDs extending along a longitudinal axis of said LED base support; and
   an optical element configured with said LED base support, said optical element having optical characteristics that result in at least 50% of the light produced by said LEDs being projected sideways from said fixture in oppositely directed side zones that flank a central zone wherein light is blocked from projecting below said fixture;
   wherein said side zones define an angular sector within a range of from horizontal relative to said LED base support to less than about 60° below horizontal.

17. The greenhouse of claim 16, wherein said optical element comprises reflector structure disposed relative to said LEDs to reflect emitted light into said side zones and away from said central zone.

18. The greenhouse of claim 16, wherein said optical element comprises a linear refractive lens disposed relative to said LEDS such that light emitted from an exit face of said lens is directed into said side zones.

19. The greenhouse of claim 18, wherein said lens is a converging lens.

20. The greenhouse of claim 18, wherein said lens is a combination of a linear total internal reflection (TIR) lens disposed opposite from said LEDs and oppositely oriented side refractive lenses.

* * * * *